July 12, 1927.

J. H. SEITER

COASTER SLED

Filed March 19, 1926

Inventor
J. H. Seiter,
By Byron B. Collings.
Attorney

July 12, 1927.  
J. H. SEITER  
COASTER SLED  
Filed March 19, 1926  
1,635,641  
3 Sheets-Sheet 2
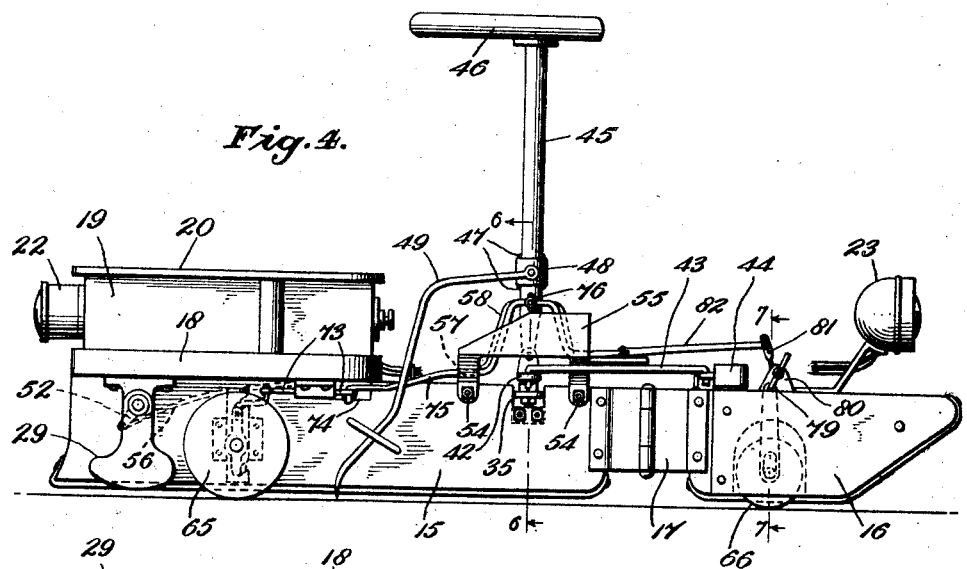
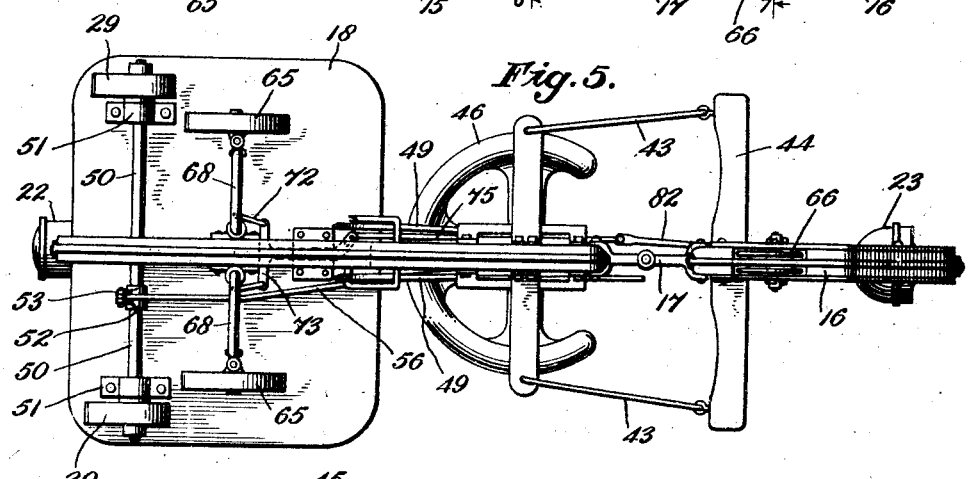
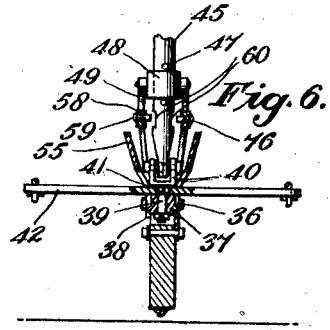
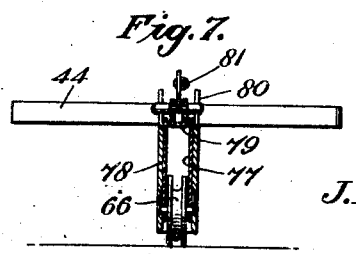
Inventor  
J. H. Seiter,  
By Byrn B. Collings  
Attorney

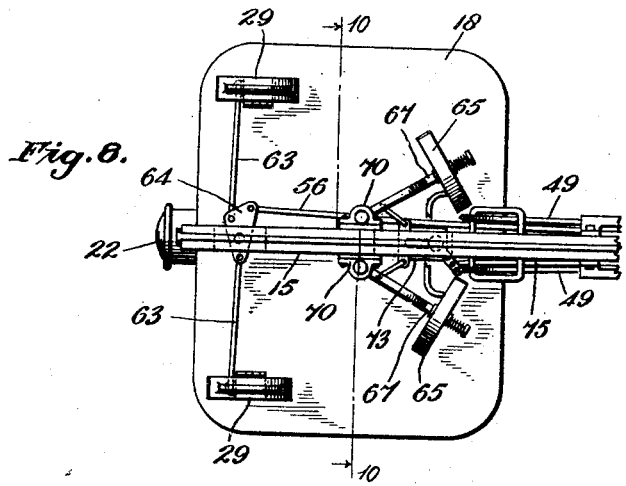
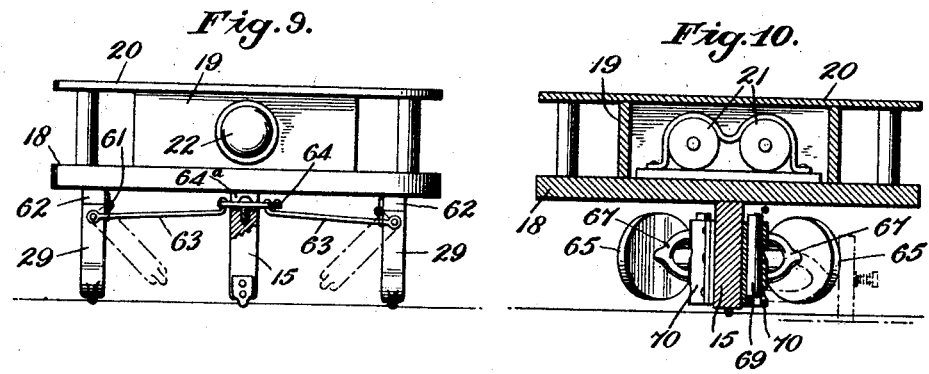
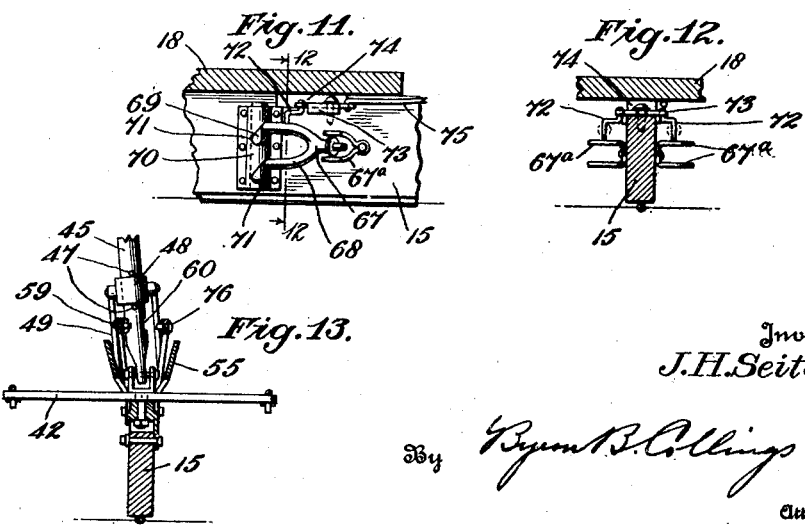

Patented July 12, 1927.

1,635,641

UNITED STATES PATENT OFFICE.

JACOB H. SEITER, OF MARION, OHIO.

COASTER SLED.

Application filed March 19, 1926. Serial No. 95,917.

My invention relates to coaster sleds and has as an object to improve generally and render more practical vehicles of this character.

Another object of my invention is to provide a coaster sled having manually operated propelling means.

A further object of my invention is to provide a coaster sled having both wheels and runners together with means whereby either the wheels or the runners may be moved into operative position, and the coaster sled or vehicle adapted for travel over either ground or snow.

Other objects and advantages of my invention will become apparent during the course of the following description, and it is to be expected, that in use still other objects and applications of my invention will be realized.

The inventive idea is capable of a number of mechanical embodiments, several of which are disclosed in the accompanying drawing. It is to be understood, however, that the drawings are for the purpose of illustration only and are not to be construed as definitive of the limits of the inventive idea, reference being had to the appended claims for that purpose.

In the drawings, wherein like reference characters have been employed to designate corresponding parts throughout all views:

Fig. 4 is a side elevation of another form which my invention may assume;

Fig. 5 is a bottom plan view of the same;

Fig. 6 is a transverse section taken on the line 6—6 of Fig. 4;

Fig. 7 is a transverse section taken on the line 7—7 of Fig. 4;

Fig. 8 is a bottom plan view of a portion of the sled showing a modified manner of mounting the runners;

Fig. 9 is a rear elevation partly in section of the form shown in Fig. 8;

Fig. 10 is a transverse section taken on the line 10—10 of Fig. 8;

Fig. 11 is a detailed view of the wheel mount;

Fig. 12 is a transverse section taken on the line 12—12 of Fig. 11; and,

Fig. 13 is a view similar to Fig. 6 showing the parts in a different position.

Figure 1:
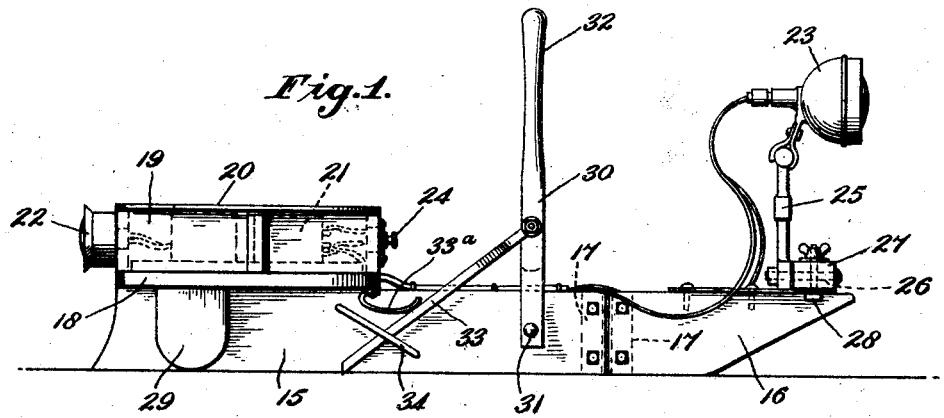
Fig. 1 is a side elevation of one form which my coaster sled may assume.
Figure 2:
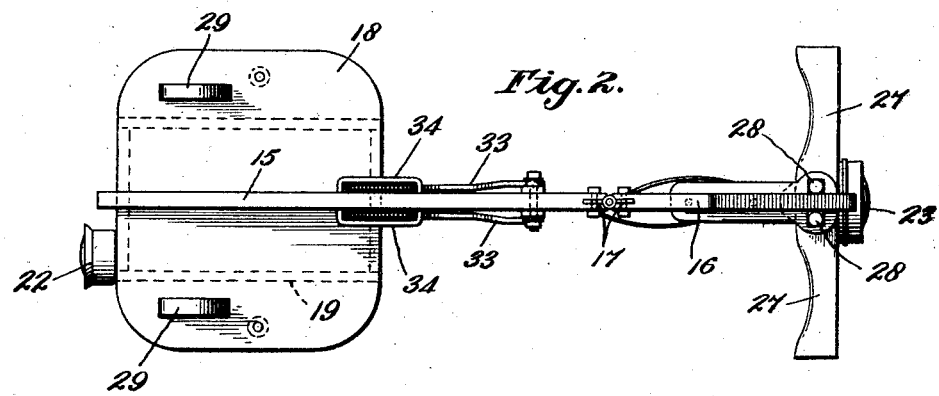
Fig. 2 is a bottom plan view of the same.
Figure 3:
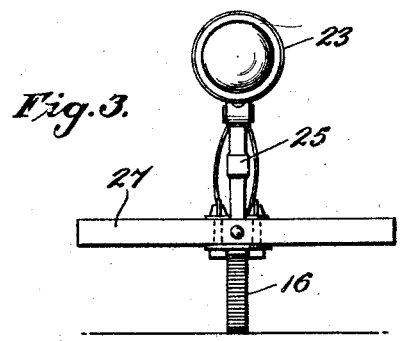
Fig. 3 is a front elevation of the form shown in Fig. 1.

Referring now to the drawings and particularly to Figs. 1 to 3, thereof, the numeral 15 designates the major runner of the sled and the numeral 16 a forward guiding runner, the latter being pivotally connected to the major runner section by a suitable hinge 17.

Mounted adjacent the rear end of the major runner section and on the upper edge thereof is a box like seat consisting of a floor 18, side walls 19 and top 20, the interior of the box constituting a storage space for the batteries 21, which supply electricity to a tail light 22 and head light 23. A suitable switch 24 may be provided for making and breaking the circuit through the lights.

The tail light 22 may be mounted on the rear wall 19 of the box like seat and the head light 23 is preferably carried by a standard 25 bolted as at 26 to a foot rest 27 which in turn is bolted as at 28 to the forward end of the guiding runner 16. The foot rest 27 is adapted to receive the feet of a person riding on the sled, and forms means by which the guiding runner 16 may be turned about its pivot 17 and the sled steered.

Carried by the floor 18 of the box like seat and extending downwardly therefrom are a pair of auxiliary runners 29. These runners are parallel to but spaced from the major runner section 15, and form means for supporting the rear end of the sled in upright position.

In order to propel the sled there is provided a lever arm 30 pivoted as at 31 to the major runner section 15. This lever arm has its free end shaped to form a handle 32 and has pivotally secured to it, intermediate its handle and pivot point, a pair of pointed rods 33, the free ends of which fall by gravity into contact with the snow or ice over which the sled is traveling. A pair of U-shaped guides 34 carried by the sides of the runner 15 serve to limit outward movement of the rods 33 away from the sides of the runner.

The operation of the sled so far described should be clear. A person seated on the seat 20 may guide the sled with his feet by means of the foot rest 27, and may propel the sled by oscillating the lever arm 30 about its pivot 31, the rods 33 sliding over the snow upon forward movement of the lever and digging into the snow and under the influence of springs 33ª and pushing the sled forward upon backward movement of the lever.

In the form of the invention illustrated in the remaining figures of the drawing there are provided means whereby the auxiliary runners may be moved out of engagement with the snow in order to produce a sled with but a single center runner, and means whereby the sled may be converted into a wheeled vehicle to travel on bare ground.

In this form of my invention the main elements, namely the major runner 15, guide runner 16, hinge 17 and box like seat structure 18, 19 and 20 are substantially the same as those described. The means for driving the sled however, and the method of mounting the auxiliary runners 29 are different.

In this form of the invention a recess 35 is formed in the upper edge of the major runner 15 adjacent the forward end thereof and in this recess is rigidly mounted by means of bolts 36 passing through the body of the runner a base plate 37 provided with a centrally disposed bore 38 which rotatably receives the shank 39 of a U-shaped yoke 40. The upper end of the shank 39 is of angular cross section as at 41 to rigidly receive the cross member 42, the latter being connected by suitable links 43 to a similar cross member 44 rigidly carried by the guide runner 16. Pivotally mounted in the yoke 40 is a steering column 45 provided with a suitable handle 46, and it will readily be seen that by this construction, turning movement of the column will be directly translated to the front guide runner of the sled.

Loosely supported on the steering column 45, by means of suitable stops 47 is a collar 48 to which are pivotally secured the rods 49, which are similar to the rods 33 described in the first form of my invention. By virtue of the loose mounting of the collar 48, it is apparent that the steering column 45 may be freely rotated without movement of the rods 49, while by virtue of the pivotal connection of the steering column with the yoke 40, the former may be oscillated to propel the sled through the rods 49.

Referring now particularly to Figs. 4 and 5 of the drawing it is to be noted that the auxiliary runners 29 are so mounted that they may be swung out of engagement with the snow over which the sled is traveling and the sled made to travel on the single central runner 15—16. This is accomplished by rigidly securing the auxiliary runners 29 to a shaft 50 and rotatably supporting this shaft on the under side of the floor 18 by bearing blocks 51. A collar 52 having the laterally extending forked arms 53, is secured to the shaft 50 for a purpose to be hereinafter more fully described.

Secured to the body portion of the runner 15 by means of bolts 54 and spanning the cutout portion 35 is a U-shaped housing 55 which extends upwardly above the runner 15 and partially surrounds the steering column 45. It is to be understood, however, that this shield is spaced from the steering column and permits the latter to be rocked a considerable distance to each side as shown in Figs. 6 and 13.

Secured to the forked arm 53 of the collar 52 is a rod 56 which extends forwardly beneath the floor 18 and through a suitable guide slot 57 formed in the rear of the housing 55. Within the housing 55 the rod 56 is bent upwardly as at 58 and terminates in a lateral projection 59 adjacent the steering column 45. In actual construction it has been found best to form this projection by means of a bolt threaded transversely through the end of the rod, but it is obvious that this projection might be formed in any one of a number of ways as for example by bending the end portion of the rod.

This lateral projection 59 is adapted to be received in one of a pair of apertures 60 formed in the steering column 45, when the latter is rocked to the position shown in Fig. 13 of the drawings. When the steering column is in this position with the lateral projection 59 hooked or engaged in the aperture 60 it is apparent that forward movement of the former about its pivotal mounting in the yoke 40 will cause corresponding forward movement of the rod 56 rotating the shaft 50 and rotating the auxiliary runners 29 to a position out of engagement with the snow. Similarly rearward movement of the column 45 will rotate the shaft 50 in the opposite direction, thus returning the runners to their normal position. It is of course to be understood that the steering column 45 is normally in the position shown in Fig. 6 of the drawing with its aperture 60 spaced from the lateral projection 59, so that it may be oscillated to drive the sled without shifting the position of the auxiliary runners.

In Figs. 8, 9, I have shown a modified form of mounting for the auxiliary runners. In this form the runners 29 are hinged as at 61 to suitable supporting members which may be in the form of blocks 62 secured to the underside of the floor 18. The runners are adapted to be swung inwardly as shown in Fig. 9 there being provided for this purpose a pair of operating rods 63. These rods have their inner ends secured to two of the corners of a triangular shaped plate 64 pivoted in a cut away portion 64ª of the runner 15. The third corner of the triangular plate 64 receives the end of the operating rod 56.

From the above it will be clear that reciprocatory movement of the rod 56 is converted into rotary movement of the plate 64 and that this movement of the plate 64 serves to swing the runners 29 to raised or lowered position by the rods 63.

Considering now the means for adapting the sled to travel on bare ground as well as on snow, it is to be noted that there are provided a pair of rear wheels 65 and a front wheel 66. These wheels are normally in raised position above the lower edge of the runners so as not to interfere in any way with the travel of the sled over snow, but there is provided means whereby the wheels may be lowered to a point below the lower edge of the runners so that the sled body will be supported entirely by the wheels with the runners off of the ground.

Referring particularly to Figs. 10 and 11 of the drawing it is to be noted that each of the wheels 65 is supported on a stub axle 67, the inner end of which is forked to form the arms 68 rigidly joined by a cross member 69. This cross member 69 is rotatably supported in a semi-cylindrical bearing 70 mounted on the side of the runner 15, and this bearing is provided with the cam slots 71 through which the forked arms 68 extend. The cam slots slope upwardly as shown in Fig. 11 of the drawing, and it is apparent that as the forked arms are swung inwardly toward the center of the sled to the position shown in Fig. 10, these arms will ride upwardly in the cam slots, whereby the wheels will be raised out of engagement with the ground. A pair of U-shaped supports 67ª are secured to the sides of the runner 15 for receiving the stub axles 67 when the latter are swung to their innermost position.

Suitable links 72 are provided to swing the forked arms, these links having one end attached to the forked arms and the other end attached to a cross link 73 mounted for longitudinal sliding movement in a slot 74 formed between the floor 18 and the upper edge of the runner 15. An operating rod 75 is connected to the slide 73 and extends forwardly to a point adjacent the steering column where it is provided with a lateral projection 76 which is adapted to be engaged by the other of the apertures 60 formed in the steering column, so that this rod may be reciprocated in a manner similar to that by which the rod 56 is reciprocated. It is to be understood that the operating rods 56 and 75 are on opposite sides of the runners 15 and that only one of the projections 59 and 76 are adapted to be engaged by the apertures 60 at a time, the projection which is engaged being determined by the operator and being effected by rocking the steering column to the desired side.

The front wheel 66 is carried by a bearing 77 mounted for vertical movement in a slot 78 formed in the front or guiding runner. The upper end of this bearing is secured to a crank arm 79 rotatably supported in a bracket 80, the said crank arm being provided with a lever arm 81 by which it may be rotated. A link 82 has one end connected to this lever arm and its opposite end connected to an operating rod which preferably forms the forward continuation of the operating rod 75. By this construction the front and rear wheels may simultaneously be moved by reciprocation of the rod 75.

From the above it will be seen that I have provided a coaster sled which may be used equally well on bare ground or snow. I have provided a sled which while normally supported by a plurality of runners, may be quickly converted into a sled with but a single central runner. It will further be seen that I have provided a sled having novel manually operated propelling means, which may be used equally well with the sled traveling over the snow or bare ground.

While I have shown and described several of the more to be preferred forms which my invention may assume, it is to be understood that such showing and description is for the purpose of illustration only and is not definitive of the limits of the inventive idea, reference being had to these appended claims for that purpose.

I claim:

1. In a coaster sled, a single central runner provided with a pivoted steering section at one end thereof; an arm pivoted to said runner; ground engaging rods at either side of said runner, pivoted to said arm; and means carried by said runner for guiding said rods.

2. In a coaster sled the combination with the body portion thereof of a steering column mounted for pivotal movement about an axis transverse to the body portion and rocking movement about an axis longitudinal to the body portion, and means carried by the steering column for propelling the sled.

3. In a coaster sled the combination of a major central runner, auxiliary side runners capable of being swung into and out of engagement with the surface over which the sled is traveling, a steering column, and means engageable by the steering column for swinging the auxiliary side runners.

4. The combination with the runner of a coaster sled of wheels carried by said runner, said wheels being normally supported above the lower edge of the runner and out of contact with the surface over which the sled is traveling, a steering column for the sled, and means engageable by the steering column for shifting said wheels to a position below the runner and into contact with the surface over which the sled is traveling.

5. A coaster sled comprising a central runner, a seat mounted on the rear of said central runner, auxiliary runners secured to the underside of said seat, wheels carried by said central runner, said wheels and said auxiliary runners being mounted for adjustment into and out of contact with the surface over which the sled is traveling, a steering column mounted on the central runner and means selectively engageable by said steering column for individually adjusting said wheels and said auxiliary runners.

6. The combination with the central runner of a coaster sled of vertically movable auxiliary runners associated with said central runner, vertically movable wheels carried by said central runner, a steering column and means engageable by said steering column for moving both the wheels and the auxiliary runners.

7. The combination with the central runner of a coaster sled of auxiliary runners mounted for swinging movement from a position in contact with the surface over which the sled is traveling to a position out of contact with the said surface, wheels carried by said central runner, said wheels being likewise mounted for swinging movement from a position in contact with the surface over which the sled is traveling to a position out of contact with the said surface, a steering column for the sled, means actuated by the steering column for propelling the sled, and means engageable by the steering column for swinging either the wheels or the auxiliary runners into or out of engagement with the surface over which the sled is traveling.

8. A coaster sled comprising a central runner, a seat mounted on the rear of said runner, auxiliary runners secured to the under side of said seat, wheels mounted on the sides of said runner, said auxiliary runners and said wheels each being mounted for swinging movement into and out of engagement with the surface over which the sled is traveling, operating rods for said auxiliary runners and said wheels, each of said operating rods being provided with a lateral projection, a steering column mounted on the central runner for pivotal movement about an axis transverse thereto and rocking movement about an axis longitudinal thereof, means carried by the steering column for driving the sled, said steering column being further provided with apertures whereby when the steering column is rocked to one side, the lateral projection on one of the operating rods will be seated in one of the apertures for the purpose of operatively connecting this operating rod to the steering column and when the steering column is rocked to the other side the lateral projection on the other operating rod will be seated in the other aperture for operatively connecting the steering column to the last mentioned operating rod.

In testimony whereof I affix my signature.

JACOB H. SEITER.